(12) United States Patent
Zheng et al.

(10) Patent No.: US 12,382,046 B2
(45) Date of Patent: Aug. 5, 2025

(54) METHOD AND DEVICE FOR VIDEO CODING AND DECODING

(71) Applicants: HUAWEI TECHNOLOGIES CO., LTD., Guangdong (CN); TSINGHUA UNIVERSITY, Beijing (CN)

(72) Inventors: Xiaozhen Zheng, Shenzhen (CN); Zhen Mao, Beijing (CN); Ziyuan Wang, Beijing (CN); Yun He, Beijing (CN); Xiaozhong Xu, Beijing (CN); Jianhua Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/302,761

(22) Filed: Apr. 18, 2023

(65) Prior Publication Data
US 2023/0262221 A1    Aug. 17, 2023

Related U.S. Application Data

(63) Continuation of application No. 17/164,502, filed on Feb. 1, 2021, now Pat. No. 11,659,184, which is a
(Continued)

(30) Foreign Application Priority Data

| Sep. 14, 2007 | (CN) | ......................... 200710153924.5 |
| May 9, 2008 | (CN) | ......................... 200810096456.7 |

(51) Int. Cl.
*H04N 7/12* (2006.01)
*H04N 19/126* (2014.01)
(Continued)

(52) U.S. Cl.
CPC ........... *H04N 19/126* (2014.11); *H04N 19/17* (2014.11); *H04N 19/174* (2014.11);
(Continued)

(58) Field of Classification Search
CPC .... H04N 19/126; H04N 19/17; H04N 19/174; H04N 19/436; H04N 19/46; H04N 19/61;
(Continued)

(56) References Cited

U.S. PATENT DOCUMENTS

| 7,436,888 B2 * | 10/2008 | Kim ....................... H04N 19/89 |
| | | 375/240 |
| 7,924,625 B2 | 4/2011 | Li et al. |

(Continued)

FOREIGN PATENT DOCUMENTS

| CN | 1593065 A | 3/2005 |
| JP | 2001086002 A | 3/2001 |

(Continued)

OTHER PUBLICATIONS

Joint Committee Draft (CD), Joint Video Team (JVT) of ISO/IEC MPEG and ITU-TVCEG, 3rd Meeting, Fairfax, Virginia, USA, Draft ISO/IEC 14496-10, JVT-C167, pp. i-132, International Organization for Standardization and International Telecommunication Union, Geneva, Switzerland (May 6-10, 2002).

(Continued)

*Primary Examiner* — Gims S Philippe

(57) ABSTRACT

A method and device for coding and decoding are disclosed. The method includes: dividing a picture to be encoded into several slices, each containing macroblocks continuous in a designated scanning sequence in the picture; dividing slices in the picture into one or more slice sets according to attribute information of the slices, each slice set containing one or more slices; and encoding the slices in the slice sets according to slice and slice set division information to get a coded bit stream of the picture. The decoding method includes: obtaining slice and slice set division information from a bit stream to be decoded and decoding the bit stream according to the obtained slice and slice set division information. The invention improves the performance of video
(Continued)

transmission effectively and realizes region based coding. The implementation of coding and decoding is simple and the complexity of coding and decoding systems is reduced.

16 Claims, 3 Drawing Sheets

Related U.S. Application Data continuation of application No. 16/573,148, filed on Sep. 17, 2019, now Pat. No. 10,939,112, which is a continuation of application No. 15/418,496, filed on Jan. 27, 2017, now Pat. No. 10,432,938, which is a continuation of application No. 14/451,083, filed on Aug. 4, 2014, now Pat. No. 9,769,482, which is a continuation of application No. 12/724,076, filed on Mar. 15, 2010, now Pat. No. 8,831,107, which is a continuation of application No. PCT/CN2008/072362, filed on Sep. 12, 2008.

(51) Int. Cl.
| | | |
|---|---|---|
| *H04N 19/17* | (2014.01) | |
| *H04N 19/174* | (2014.01) | |
| *H04N 19/436* | (2014.01) | |
| *H04N 19/46* | (2014.01) | |
| *H04N 19/61* | (2014.01) | |
| *H04N 19/70* | (2014.01) | |
| *H04N 19/172* | (2014.01) | |
| *H04N 19/176* | (2014.01) | |
| *H04N 19/184* | (2014.01) | |

(52) U.S. Cl.
CPC ........... *H04N 19/436* (2014.11); *H04N 19/46* (2014.11); *H04N 19/61* (2014.11); *H04N 19/70* (2014.11); *H04N 19/172* (2014.11); *H04N 19/176* (2014.11); *H04N 19/184* (2014.11)

(58) Field of Classification Search
CPC .... H04N 19/70; H04N 19/172; H04N 19/176; H04N 19/184; H04N 19/119
USPC .................................................. 375/240.03
See application file for complete search history.

(56) References Cited

U.S. PATENT DOCUMENTS

| | | | |
|---|---|---|---|
| 7,924,925 B2* | 4/2011 | He ....................... | H04N 19/176 |
| | | | 375/240 |
| 8,005,149 B2 | 8/2011 | Lerner et al. | |
| 2003/0112867 A1 | 6/2003 | Hannuksela et al. | |
| 2004/0066852 A1* | 4/2004 | MacInnis ............... | H04N 19/17 |
| | | | 375/E7.207 |
| 2004/0240559 A1 | 12/2004 | Prakasam et al. | |
| 2005/0053158 A1* | 3/2005 | Regunathan ........... | H04N 19/86 |
| | | | 375/E7.199 |
| 2006/0078209 A1 | 4/2006 | Kobayashi | |
| 2007/0183676 A1 | 8/2007 | Hannuksela et al. | |
| 2008/0151997 A1* | 6/2008 | Oguz ..................... | H04N 19/61 |
| | | | 375/E7.18 |
| 2008/0170624 A1 | 7/2008 | Yamada et al. | |
| 2010/0158135 A1* | 6/2010 | Yin ....................... | H04N 19/132 |
| | | | 375/240.26 |

FOREIGN PATENT DOCUMENTS

| | | |
|---|---|---|
| JP | 2007174568 A | 7/2007 |
| WO | 2007019790 A1 | 2/2007 |

OTHER PUBLICATIONS

Series H: Audiovisual and Multimedia Systems Infrastructure of audiovisual services—Coding of moving video; Amendment 2: New profiles for professional applications, Recommendation ITU-T H.264, pp. 1-75, International Telecommunication Union, Geneva, Switzerland (Apr. 2007).

Series H: Audiovisual And Multimedia Systems; Infrastructure of audiovisual services—Coding of moving video; Advanced video coding for generic audiovisual services, Recommendation ITU-T H.264, pp. 1-669, International Telecommunication Union, Geneva, Switzerland (Mar. 2010).

Infonnalion technology—Advanced coding of audio and video—Part 2: Video, GB/T20090 2, pp. i-94, (2006).

Infonnation technology—Generic coding of moving pictures and associated audio information: Video, ISO/IEC 13818-2, Amendment 5, pp. i-202, International Organization for Standardization, Geneva, Switzerland (Apr. 15, 2000).

Zhanglei Wang et al., Test data compression for IP embedded cores using selective encoding of scan slices. IEEE International Conference on Test, 2005., Feb. 6, 2006, 10 pages.

* cited by examiner

METHOD AND DEVICE FOR VIDEO CODING AND DECODING

CROSS-REFERENCE TO RELATED APPLICATIONS

This application is a continuation of U.S. patent application Ser. No. 17/164,502, filed on Feb. 1, 2021, which is a continuation of U.S. patent application Ser. No. 16/573,148, filed on Sep. 17, 2019, now U.S. Pat. No. 10,939,112. which is a continuation of U.S. patent application Ser. No. 15/418, 496, filed on Jan. 27, 2017, now U.S. Pat. No. 10,432,938 which is a continuation of U.S. patent application Ser. No. 14/451,083, filed on Aug. 4, 2014, now U.S. Pat. No. 9,769,482 which is a continuation of U.S. patent application Ser. No. 12/724,076, filed on Mar. 15, 2010, now U.S. Pat. No. 8,831,107 which is a continuation of International Patent Application No. PCT/CN2008/072362, filed on Sep. 12, 2008, which claims priority to Chinese Patent Application No. 200710153924.5, filed on Sep. 14, 2007, and Chinese Patent Application No. 200810096456.7, filed on May 9, 2008. All of the afore-mentioned patent applications are hereby incorporated by reference in their entireties.

FIELD OF THE INVENTION

The invention relates to coding and decoding technologies, and in particular, to a method and device for video coding and decoding.

BACKGROUND

In a video coding/decoding system, a picture may be divided into several image blocks or macroblocks, and motion estimation is carried out based on blocks or macroblocks. The residual after motion estimation is transformed and quantized. Finally, entropy coding is performed on the quantized coefficient and the information obtained after the entropy coding is written into a bit stream. After a picture is divided into macroblocks, the macroblocks will be organized into slices.

In a video coding/decoding system, after the decoder receives video packets from the encoder, the decoder will organize contents in the data packets according to a certain rule and obtain a reconstructed picture after dequantization, detranformation and motion compensation.

In the conventional art, in a video coding/decoding system, slice division methods include:

1. Method Defined by Moving Picture Experts Group 2 (MPEG-2)

According to MPEG-2, a slice (block group) is defined as a series of any number of macroblocks. A block group includes at least one macroblock and no overlap should exist between any two block groups. The first and the last macroblocks in a block group must be in one macroblock row. Block groups appear in a bit stream from left to right and from the top down following the optical grating scanning sequence starting with the upper left corner of a picture.

During the implementation of the invention, the inventor discovers at least the following weaknesses in the conventional art:

(1) MPEG-2 requires the first macroblock and the last macroblock appear in a same macroblock row, which restricts the flexibility of block groups in length and spatial distribution. One block group can include macroblocks in at most one horizontal row so that the flexibility of a coding/decoding system is restricted.

(2) In certain scenarios, coding and decoding of a macroblock cannot use information of adjacent macroblocks and thus the efficiency of coding and decoding is low.

(3) Because block groups must appear in a bit stream in the sequence of being met, a picture cannot be sliced or encoded based on multiple macroblock rows or based on regions or objects.

2. Method Defined by H.264

In the H.264 standard, a slice is defined as an integer number of macroblocks or macroblock pairs arranged in the optical grating scanning sequence inside a specific slice set. Although a slice contains an integer number of macroblocks or macroblock pairs arranged in the optical grating scanning sequence inside a slice group, the macroblocks or macroblock pairs are not necessarily arranged continuously in the optical grating scanning sequence within a picture. A macroblock address is obtained through the address of the first macroblock and the mapping from the macroblock to a slice group. A slice group is defined as a subset of macroblocks or macroblock pairs in the picture. To divide a picture into slice groups is to organize certain macroblocks in the picture into a slice group according to the mapping from macroblocks to slice groups, which means macroblocks are organized according to certain spatial mappings.

During the implementation of the invention, the inventor finds at least the following weaknesses in the conventional art:

(1) Because the mapping from macroblocks to slice groups is stored in the picture header, an extra storage cost is imposed on the encoder and the decoder. Besides, the encoder must know the spatial mappings of macroblocks in advance, which is not good for real-time coding.

(2) Because of the mapping of macroblocks, it is unnecessary for macroblocks in one slice to be continuous in the optical grating scanning sequence so that the encoder and the decoder have to provide an extra storage space to store macroblocks that are not encoded and decoded in a slice.

(3) Because macroblocks in one slice or one slice group are not continuous in the optical grating scanning sequence, the encoder and the decoder must continuously search for and locate the physical addresses of adjacent macroblocks, which causes an additional computing cost.

SUMMARY

The embodiments of the invention provide a method and device for video coding and decoding, to improve the video transmission performance and simplify the implementation of the coding and decoding system.

A video coding method includes: (1) dividing a picture to be encoded into several slices, each containing macroblocks continuous in a scanning sequence in the picture; (2) dividing the slices contained in the picture into one or more slice sets, each containing one or more slices; and (3) encoding slices in the slice sets according to slice and slice set division information to get a coded bit stream of the picture.

A video encoder includes: (1) a slice dividing unit, configured to divide a picture to be encoded into several slices, each containing macroblocks continuous in a scanning sequence in the picture; (2) a slice set dividing unit, configured to divide slices in the picture into one or more slice sets according to attribute information of the slices obtained by the slice dividing unit, where each slice set contains one or more slices; and (3) an encoding unit, configured to encode slices in the slice sets divided by the slice set dividing unit to get a coded bit stream of the picture.

A video decoding method includes: (1) obtaining slice and slice set division information from a bit stream to be decoded, where a slice includes macroblocks continuous in a scanning sequence in a picture and a slice set includes one or more slices; and (2) decoding the bit stream according to the obtained slice and slice set division information.

A video decoder includes: (1) a slice information obtaining unit, configured to obtain slice and slice set division information from a bit stream to be decoded, where a slice includes macroblocks continuous in a scanning sequence in a picture and a slice set includes one or more slices; and (2) a picture reconstructing unit, configured to: decode the bit stream according to the slice and slice set division information obtained by the slice information obtaining unit and reconstruct the picture.

With the solution provided by the embodiments of the invention, slices and slice sets are divided appropriately so that the encoder and decoder can perform coding and decoding flexibly according to actual needs and therefore the performance in video transmission is improved. Furthermore, the implementation of coding and decoding is simple and the complexity of the coding and decoding systems is reduced.

DETAILED DESCRIPTION OF EMBODIMENTS

Figure 1:
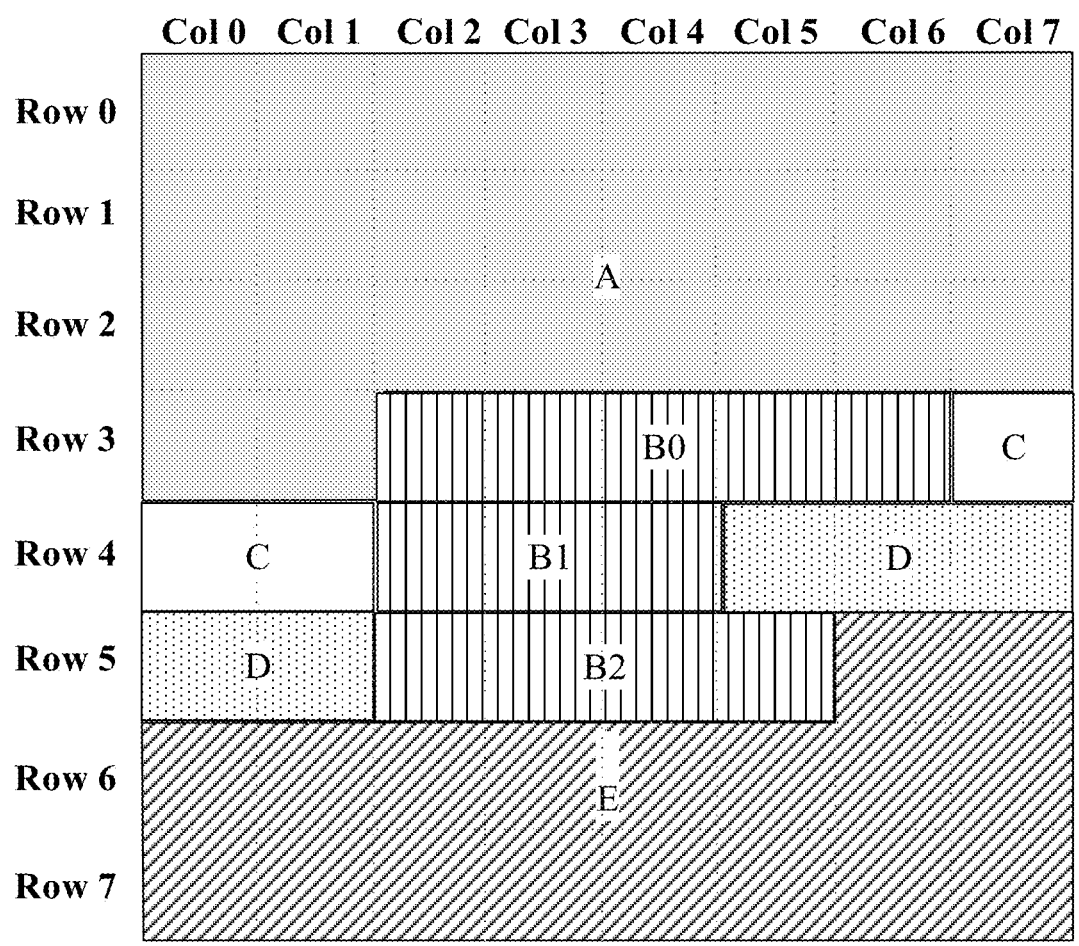
FIG. 1 is a schematic drawing of the division of slices and slice sets according to an embodiment of the invention.

In order to make the technical solution, objectives and merits of the invention clearer, a detailed description of the invention is given below by reference to accompanying drawings and preferred embodiments.

The video coding method according to an embodiment of the invention includes: dividing a picture to be encoded into several slices, each containing continuous macroblocks in the picture in the scanning sequence, such as the optical grating scanning sequence or another predetermined scanning sequence; dividing slices in the picture into one or more slice sets according to slice attributes, where one slice set includes multiple slices; encoding the slices in a slice set according to slice and slice set division information, such as slice set serial number and slice position information, to get a coded bit stream of the picture. The attributes may include but are not limited to one or more of the following items: network transport condition, spatial continuity of slices, picture characteristics, spatial resolution, content of the picture or region, and picture coding quality.

In the embodiment of the invention, for ease of compatibility with other technologies, a slice set enable flag may be written in the coded bit stream if necessary. The flag indicates whether slice sets are divided during the coding of the current picture. When the method in the embodiment of the invention is used, the flag is set to be valid; otherwise the flag is set to be invalid.

Further, in the embodiment of the invention, the coding of slices in a slice set may be at least one of the following coding operations:

(1) Encoding at least one item of the horizontal position parameter and vertical position parameter of each slice in the slice set so that the decoder knows the position of the slice in the reconstructed picture and thus is able to decode the slices.

(2) Encoding identification information of the slice set so that the decoder can identify the slices in the set or identify the slice set of a slice. The slice set identification information includes but is not limited to slice set serial number allocated for slice sets or the slice set index allocated for slices, or slice distance index indicating the number of slices that are not in the slice set between two slices adjacent in the scanning sequence in the slice set, or start macroblock and number of macroblocks of the slice set.

(3) Encoding information whether a current slice is the last slice in a slice set so that the decoder obtains all slices in the slice set reliably.

(4) Encoding information whether the current slice includes slice set syntax elements so that the decoder is able to determine whether the current slice contains syntax elements according to the information and further determine the syntax elements that can currently be used.

(5) Encoding information that the reference data used in the inter-frame coding of a slice is the data in the same slice set of the current slice or all data available in the picture (the information may be called the first data usage indicator), so that the decoder can choose reference data for decoding of the slice according to the information.

(6) Encoding information that the data used in the coding of macroblocks in a slice is the data in the current slice or data of other slices in the same slice set (the information may be called the second data usage indicator), so that the decoder can choose data for decoding of the macroblocks in the slice according to the information.

(7) Encoding data that is used in the coding of macroblocks in the current slice or data of other slices in the current slice set.

(8) Encoding information whether the current slice is the first slice in the slice set, so that the coding parameters of other slices in the slice set can be set according to the coding parameters of the first slice. The first slice may be the first slice in the optical grating scanning sequence of the slice set.

(9) Encoding information that slices in the current slice set use a designated quantization matrix and encode relevant parameters of the quantization matrix.

In accordance with the above video coding method, an embodiment of the invention provides a video decoding method. The method includes: the decoder receives a bit stream to be decoded and obtains division information of slices and slice sets in the bit stream; and the decoder decodes the bit stream according to the obtained division information of slices and slice sets.

If a slice set enable flag is written in the bit stream coded by the encoder, the decoder must first obtain the slice set enable flag in the coded bit stream and the division information of slices and slice sets is not obtained until the decoder determines that the current picture is divided into slice sets according to the flag.

The decoder decodes the bit stream in at least one of the following methods:

(1) Obtaining at least one item of the horizontal position parameter and vertical position parameter of each slice in the slice set from the bit stream and perform decoding according to the parameter.

(2) Obtaining slice set identification information in the bit stream and performing decoding according to the slice set identification information.

(3) Obtaining the information whether a current slice is the last slice in a current slice set in the bit stream and performing decoding according to the information.

(4) Obtaining the information whether the current slice contains syntax elements in the bit stream and perform decoding according to the information.

(5) Obtaining the information that the reference data used in the inter-frame coding of a slice is the data in the same slice set of the current slice or all data available in the picture (the first data usage indicator) and performing decoding according to the information.

(6) Obtaining the information that the data used in the coding of macroblocks in a slice is the data in the current slice or data of other slices in the same slice set (the second data usage indicator) and performing decoding according to the information.

(7) Obtaining the information that the data used in the coding of macroblocks in the slice is the data of the current slice or data of other slices in the same slice set and performing decoding according to the information.

(8) Obtaining the information whether the current slice is the first slice in the slice set and performing decoding according to the information. The parameters of other slices in the slice set may be set according to the coding parameters of the first slice. The first slice may be the first slice in the optical grating scanning sequence of the slice set.

(9) Obtaining quantization parameters used by the slices in the current slice set and performing decoding accordingly.

An important application in video coding and decoding is the region specific coding and decoding of pictures, where one picture is divided into several regions and data (like macroblocks) in a region is unnecessarily continuous in the optical grating scanning sequence but often has certain common features, such as spatial continuity or the same and similar image attributes. The region specific coding of pictures may be applied to region based quality specific coding and resolution specific coding of pictures or used with the video watermark technique. In the embodiment of the invention, region based picture coding is achieved because of the flexible division and combination of picture slices.

In the embodiment of the invention, region specific picture coding is realized through flexible combination of slices and the processing of coding and decoding scheme of the combined slices and the syntax elements used in coding and decoding. In particular, appropriate parameters or flags for identification of slice coding and decoding features may be added to the slice, sequence header and/or picture header information and the flags or parameters are flexibly combined to implement the region specific coding. Compared with the conventional art, the solution provided in the embodiment of the invention reduces the hardware complexity of the coding system and the decoding system and is well compatible with the existing coding and decoding systems.

To help understand the invention, the embodiments of the invention will be described in detail with reference to the accompanying drawings.

As shown in FIG. 1, A, B0, C, B1, D, B2 and E are slices; Row 0 to Row 7 are eight macroblock rows in a picture, where 0-7 are vertical positions of the macroblock rows in the picture counted by macroblocks; Col 0 to Col 7 are eight macroblock columns in the picture, where 0-7 are horizontal positions of the macroblock columns in the picture counted by macroblocks.

A slice is a number of macroblocks continuous in the optical grating scanning sequence and includes unnecessarily an integer number of macroblock rows. The slice does not require that the start and end macroblocks be in one macroblock row. The optical grating scanning is a scanning method that converts two-dimensional data to one-dimensional data, where scanning may start from the upper left corner of a region and proceed from left to right and from the top down.

The embodiments of the invention adopt the concept of slice set, which is a set of slices possessing common attributes including but not limited to one or more of the following items: spatial continuity of slices in a picture, picture characteristics, spatial resolution, content of the picture or region, and coding quality of the picture. The division of slice sets is decided by the encoder and the decoder can know the division mode of slice sets in the encoder according to the picture header information or slice set information.

A slice set is a loose combination of slices in a picture, where the slice coding and decoding modes are decided by the syntax element added to the video bit stream in the embodiments of the invention. Normally, the syntax element is stored in the start position of the picture header or slice. The syntax element may be a flag or parameter added in the embodiments of the invention.

With the addition of a syntax element to a slice to identify the slice feature, the encoder and the decoder will be able to decide the mode to process slices in a slice set, thus realizing region specific coding through the processing of slices in the slice set.

In implementation of the embodiments of the invention, slice specific coding may include one or more of the following means:

(1) Adding a parameter that identifies a slice group to a slice to specify the slice set where the slice belongs. The parameter is called slice_set_index. In one picture, slices having the same slice_set_index belong to one slice set.

(2) Adding a flag (the first data usage indicator) to a slice, to specify whether data of other slices belonging to a same slice set can be used when data of the current slice is coded or decoded. For example, when the flag is set to 1, it indicates that the data of other slices belonging to the same slice set can be used when data of the current slice is coded or decoded; when the flag is set to 0, it indicates that the data of other slices belonging to the same slice set cannot be used when data of the current slice is coded or decoded. Optionally, there may be other ways to set the flag.

(3) Adding a flag (syntax element flag) to a slice, to specify whether the particular syntax element (like quantization step size) used in the current slice is the same as the syntax element in other slices in the same slice set.

A number of slices in a picture form a loose slice set by one or more of the above means. Accordingly, when slice data in the slice set is coded or decoded, any of the following means may be used:

(1) Independent Coding and Decoding

In this mode, data used when the current slice is coded or decoded is independent of other slice data in the same slice set and independent of slice data in other slice sets.

(2) Dependent Coding and Decoding

In this mode, data used when the current slice is coded or decoded may come from other slice data in the same slice set but will not come from slice data in other slice sets.

In the embodiments of the invention, the encoder may set slice set parameters (such as slice set index, slice association flag and slice set syntax element indicator) for each slice according to specific needs by means of the above three slice based coding methods. If region specific coding or flexible packing is necessary, an appropriate slice set parameter can be set so that certain consistency is kept in the coding and decoding of slices in one slice set. This means region specific coding can be realized through the use of slice sets. Accordingly, the decoder provided in the embodiments of the invention may analyze the syntax element related to the slice set through the slice set elements to know the attributes of the slice and the slice set. For example, the decoded picture may be displayed by regions, or a region of the picture can be decoded independently in the decoding process.

Exemplary embodiments will be described to further explain the invention.

For ease of description, the concepts concerned in the embodiments are explained as follows:

(1) Slice set syntax set: a set that includes a number of syntax elements related to slice coding, such as quantization step size.

(2) Flexible slice set: certain slices in a picture are grouped in a certain way to form a specific set and the coding and decoding of a slice in the slice set is controlled by specific syntax elements in the slice set and the slice.

Based on the above definitions, several exemplary embodiments are described to further clarify the invention.

Embodiment 1

In the first embodiment of the invention, to realize the coding of a slice set, the encoder may write one or more of the following parameters or flags in a coded bit stream during the coding process:

(1) Adding slice_set_disable to the picture header parameter set: the flag occupies one bit and indicates whether slice sets are used in the picture; for example, the value 1 indicates slice sets are not used and 0 indicates slice sets are used.

In addition to the picture header information, slice_set_disable may also be added to the sequence header, slice header or macroblock header, and so on.

(2) Naming the last 8 bits of the start code of a slice "slice_vertical_position", which is an 8-bit unsigned integer configured to identify the vertical position of the first macroblock of the slice in the picture, and the position is measured by macroblocks. If the vertical_size of the picture is larger than 2800 bits, a 3-bit parameter slice_vertical_positon_extension may be further added to the start code of the slice. The parameters slice_vertical_positon_extension and slice_vertical_position together specify the vertical position of the slice in the picture.

(3) Adding one or more of the following parameters or flags after the slice start code:

slice_set_index: may be a 6-bit unsigned integer, allocated for each slice when the value of slice_set_disable (such as 0) specifies that the use of slice sets is enabled.

slice_horizontal_position: may be an 8-bit unsigned integer indicating the macroblock measured horizontal position of the first macroblock of the slice in the picture.

slice_horizontal_position_extension: may be a 3-bit unsigned integer, which may not appear in the bit stream if the horizontal_size of the picture is smaller than or equal to 4096 bits; otherwise if the horizontal_size of the picture is larger than 4096 bits, the parameter may be set to specify together with slice_horizontal_position the horizontal position of the slice in the picture.

slice_connect: 1 bit, when the value of slice_set_disable (such as 0) indicates the use of slice sets, indicating whether there are other slices in the current slice set that are not decoded after the current slice is decoded.

slice_set_syntax: syntax indicator of the slice set, where the syntax elements are associated with picture data coding, such as the quantization step size and the weighted prediction coefficient; it may be a 1-bit flag, indicating whether the current slice carries a slice set syntax set. For example, the value 1 indicates the presence of a slice set syntax set in the current slice and the value 0 indicates the presence of no slice set syntax set in the current slice. Besides, the syntax elements in the slice set syntax set required by the coding and decoding of the current slice are the same as the first slice in the same slice set whose slice_set_syntax is 1 and precedes the current slice in the optical grating scanning sequence.

slice_set_reference: the first data usage indicator, which may be a 1-bit flag, indicating the way to obtain reference data of the slice set; for example, the value 1 indicates only slice set data that has the same slice_set_index as the current slice set in the picture can be used as reference for coding and decoding of the data within the current slice set, and the value 0 indicates that all data available in the picture can be used as reference for coding and decoding of the data within the current slice set.

slice_independency: the second data usage indicator, which may be a 1-bit flag, indicating data can be used for coding and decoding of macroblocks in the current slice; for example, the value 1 indicates that only data in the slice can be used for the coding and decoding of macroblocks in the current slice and the value 0 indicates slice data of the same slice_set_index in the picture can be used for coding and decoding of macroblocks in the current slice provided that the slices used for coding of the current slice precede the current slice in the scanning sequence (such as the optical grating scanning sequence) and follow the previous slice whose slice_independency is 1. In the case that the slice_independency of the first slice in the optical grating scanning sequence in the slice set is 1 and the slice_independency of the current slice is 1, if slice_set_syntax is present, the value of slice_set_syntax is 1.

first_of_slice_set_flag: indicating whether the current slice is the first slice in the current slice set in the optical grating scanning sequence.

Of the above parameters or flags, slice_set_index can be used alone in a slice without slice_horizontal_position, slice_set_syntax, slice_horizontal_position_extension, slice_connect, slice_set_reference, and slice_independency. When slice_set_index is used alone in a slice, the encoder and the decoder divide slice sets according to slice_set_index values. In this case, data in the current picture and the current slice and data of slices with the same slice_set_index can be used for coding and decoding of data in the current slice but data of slices with a slice_set_index different from that of the current slice cannot be used.

Of the above parameters or flags, parameters identifying the position of a slice in a picture include: slice_horizontal_position and slice_horizontal_position_extension that identify the horizontal position of the slice and slice_vertical_position and slice_vertical_position_extension that specify the vertical position of the slice. The parameters may also exist in the picture header or sequence header, in which case they can be used with slice_set_index, with a mapping table in the picture header or sequence header to identify the position of each slice in the picture and its slice_set_index value.

In the embodiments of the invention, slice_set_index may be used together with one or more of the parameters slice_connect, slice_set_syntax, slice_set_reference, slice_independency, slice_horizontal_position, slice_vertical_position, slice_horizontal_position_extension, slice_vertical_position_extension and first_of_slice_set_flag to realize the slice set function. slice_set_index must be present in a slice, or a sequence header or a picture header to realize the division of slice sets. Data in the current picture and the current slice and data of slices with the same slice_set_index can be used for coding and decoding of data in the current data but data of slices with a slice_set_index different from that of the current slice cannot be used. One or more of the parameters slice_connect, slice_set_syntax, slice_set_reference, slice_independency and first_of_slice_set_flag can be used jointly with slice_set_index. The four parameters slice_horizontal_position, slice_vertical_position, slice_horizontal_position_extension and slice_vertical_position_extension that identify the position of a slice may be used jointly with slice_set_index and one or more of the parameters slice_connect, slice_set_syntax, slice_set_reference, slice_independency and first_of_slice_set_flag.

Based on the above parameters or flags, when the video encoder decides that region specific coding is necessary, the coding process using the parameters or flags includes:

Step 1: The picture to be coded is shown in FIG. 1. Set slice_set_disable to be valid, for example to 0, to indicate that flexible slice set technology is used in the current picture.

In the picture shown in FIG. 1, A, B0, C, B1, D, B2 and E are slices; Row 0 to Row 7 are eight macroblocks in the picture where 0-7 represent the vertical positions of the macroblock rows in the picture; Col 0 to Col 7 are eight macroblock columns in the picture, where 0-7 represent the horizontal positions of the macroblock columns in the picture; A, C, and D belong to one slice set, and B0, B1, and B2 belong to another slice set while slice E belongs to a third slice set.

Step 2: Let the slice_set_index of A, C and D be 0, the slice_set_index of B0, B1 and B2 be 1 and the slice_set_index of E be 2.

Step 3: Set the slice_connect, slice_independency and slice_set_syntax of each slice.

Because slices A, C and D belong to one slice set, the slice_connect, slice_independency and slice_set_syntax of the slices may be set as in Table 1:

TABLE 1

|   | slice_connect | slice_independency | slice_set_syntax |
|---|---|---|---|
| A | 1 | 1 | 1 |
| C | 1 | 0 | 0 |
| D | 0 | 0 | 0 |

Slices B0, B1 and B2 belong to one slice set and their slice_connect, slice_independency and slice_set_syntax may be set as in Table 2:

TABLE 2

|   | slice_connect | slice_independency | slice_set_syntax |
|---|---|---|---|
| B0 | 1 | 1 | 1 |
| B1 | 1 | 0 | 0 |
| B2 | 0 | 0 | 0 |

Slice E belongs to a slice set alone and its slice_connect, slice_independency and slice_set_syntax may be set to 0, 1, and 1.

In the two tables, because slices A, B0 and E are the first slice in their respective slice sets in the optical grating scanning sequence, their slice_set_syntax is 1 and their first_of_slice_set_flag is 1 while the first_of_slice_set_flag of other slices is 0, and a slice set syntax set is present in the three slices. Because the slice_set_syntax of B1, B2, C and D is 0, no slice_set_syntax set is present in the four slices and the slice_set_syntax of B1 and B2 is the same as that of B0 and the slice_set_syntax of C and D is the same as that of A. Optionally, the slice set syntax elements of B1/B2 and C/D are the same as the slice_set_syntax elements of slices whose first_of_slice_set_flag is 1. In this embodiment of the invention, the first_of_slice_set_flag of slices B0 and A is 1.

Step 4: According to definitions of the parameters, the slice_vertical_position and slice_horizontal_position of slices A, B0, C, B1, D, B2, and E are as follows:

Their slice_vertical_position values are: Slice A: 0, Slice B0: 3, Slice C: 3, Slice B1: 4, Slice D: 4, Slice B2: 5 and Slice E: 5; and Their slice_horizontal_position values are: Slice A: 0, Slice B0: 2, Slice C: 7, Slice B1: 2, Slice D: 5, Slice B2: 2 and Slice E: 6.

Step 5: Encoding the picture according to the parameters or flags which are also encoded into the bit stream sent to the decoder.

Step 6: The decoder performs decoding according to the parameters or flags in the bit stream received from the encoder to reconstruct the picture shown in FIG. 1.

According to the above settings and the definition of slice set, in the decoder, with respect to the picture shown in FIG. 1, the decoding of any macroblock inside slice A, C or D can use data of the other two slices; the decoding of any macroblock inside slice B0, B1 or B2 can use data of the other two slices; the decoding of macroblocks in slice E cannot use data of other slices.

Corresponding to the encoder, after the decoder resolves the slice set parameters from the bit stream, the decoding may be done by any of the following means:

(1) Single-Thread Decoding

In this mode, slices are decoded in the optical grating scanning sequence. The specific process is:

Decoding Slice A: Because A is the first slice in the picture, the decoding method may be that defined in a standard (like MPEG-2) in the conventional art.

Decoding Slice B0: Because the slice_set_index of B0 is different from that of A, the decoding of macroblocks in B0 cannot use the data of A.

Decoding Slice C: Because the slice_set_index of C is different from that of B0, the decoding of macroblocks in C cannot use the data of B0; because the slice_set_index of C is the same as that of A and the slice_independency of C is 0, the decoding of macroblocks in C can use the data of A.

Decoding Slice B1: Because the slice_set_index of B1 is different from that of C, the decoding of macroblocks in B1 cannot use the data of C; because the slice_set_index of B1 is the same as that of B0 and the slice_independency of B1 is 0, the decoding of macroblocks in B1 can use the data of B0.

Decoding Slice D: Because the slice_set_index of D is different from that of B1, the decoding of macroblocks in C cannot use the data of B1; because the slice_set_index of D is the same as that of C and the slice_independency of D is 0, the decoding of macroblocks in D can use the data of C.

Decoding Slice B2: Because the slice_set_index of B2 is different from that of D, the decoding of macroblocks in B2 cannot use the data of D; because the slice_set_index of B2 is the same as that of B1 and the slice_independency of B2 is 0, the decoding of macroblocks in B2 can use the data of B1.

Decoding Slice E: Because the slice_set_index of E is different from that of B2, the decoding of macroblocks in E cannot use the data of B2; because the slice_set_index of E is different from that of D, the decoding of macroblocks in E can use the data of D.

After slices A, B0, C, B1, D, B0 and E are decoded, because B0, B1 and B2 are in one slice set, B0, B1 and B2 can be displayed alone without A, C, D and E; alternatively, a controlling unit may display one or more of other slice sets.

(2) Parallel Decoding

In this mode, multiple threads run simultaneously to decode the slices. Supposing three threads run to decode the picture shown in FIG. 1, the decoding process is as follows:

Suppose three threads a, b, and c simultaneously decode the coded bit stream of the picture shown in FIG. 1. According to the slice_set_index of the slices in FIG. 1, slices A, C and D with the same slice_set_index are placed in thread A, and slices B0, B1 and B2 with the same slice_set_index are placed in thread B, and slice E is placed in thread C. The decoding process of each thread is the same as the decoding of each slice in single-thread mode.

After threads A, B and C decode the data of all slices, the contents of the slices can be spliced: the splicing is performed in the ascending sequence of slice_vertical_position in the slices; if the slice_vertical_position of slices is the same, the splicing is performed according to the slice_horizontal_position sequence. For example, because the slice_vertical_position of slice A is 0, the data of slice A is put in the reconstructed picture region ahead of the data of other slices; because the slice_vertical_position of slice B0 is the same as that of slice C while the slice_horizontal_position of slice B0 is smaller than that of slice C, the data of slice B0 is put in the reconstructed picture region before the data of slice C. In this way, the seven slices A, B0, C, B1, D, B2 and E will be spliced to reconstruct the picture shown in FIG. 1 after the coding and decoding processing.

Because, slices A, C, and D, slices B0, B1 and B2, and slice E belong to three different slice sets, and are decoded respectively in three threads, slices A, C, and D, slices B0, B1 and B2, and slice E can be displayed separately.

In the above two decoding methods, if the slice_set_syntax of a slice is 0, the slice set syntax set of the slice is the same as the slice_set_syntax set of a slice preceding the current slice in the optical grating scanning sequence whose slice_set_syntax is 1. Optionally, the slice set syntax set of the slice is the same as the slice_set_syntax set of the slice in the current slice set whose first_of_slice_set_flag is 1.

Embodiment 2

In the first embodiment of the invention, a picture is divided into slices according to the value of slice_set_index. In addition to this, the second embodiment of the invention provides a slice set dividing method based on slice_distance. The specific solution is as follows:

The slice_distance is an integer number indicating the number of slices that are not in the slice set between two slices adjacent in the optical grating scanning sequence in the slice set. For example, the current slice is the $10^{th}$ slice in the picture in the optical grating scanning sequence and the slice_distance of the current slice is 3. Then, it is known that the slice in the same slice set and preceding the current slice in the optical grating scanning sequence is the $6^{th}$ slice in the picture in the optical grating scanning sequence. This means, the $6^{th}$ and the $10^{th}$ slices in the optical grating scanning sequence are in the same slice set. The decoder is able to know the division of slice sets in the picture according to the slice_distance.

Further, slice_distance may also be used with one or more of the parameters slice_connect, slice_set_syntax, slice_set_reference, slice_independency, slice_horizontal_position, slice_vertical_position, slice_horizontal_position_extension, and slice_vertical_position_extension. The specific use of the parameters is the same as that described in the first embodiment.

Or, the slice_distance parameter may be used in a slice alone. In this case, the coding and decoding of data of a slice in the slice set may use data of other slices in the same slice set, but data outside the current slice set cannot be used.

Embodiment 3

In the third embodiment of the invention, the division of slice sets is achieved by writing the position of the first macroblock of each slice set in a picture, the position of the first macroblock in each slice in a slice set, and the number of continuous macroblocks included in the slice set, in the sequence header or picture header.

In the embodiment, slice set parameters may include one or more of the parameters slice_connect, slice_set_syntax, slice_set_reference, slice_independency, slice_horizontal_position, slice_vertical_position, slice_horizontal_position_extension and slice_vertical_position_extension. The specific use of the parameters is the same as that described in the first embodiment.

Embodiment 4

In the fourth embodiment, when a slice set covers a rectangle region, the division of slice sets may be achieved by writing the position coordinates of the slice set in the sequence header of the picture, the picture header or the first slice in the slice set and instructing that no slice start code is present in other slices in the slice set.

Specifically, the coordinates of the upper left corner of the region covered by the slice set and the length and width of the region may be written in the sequence header, picture header or the first slice of the slice set. Further, a 1-bit flag is written in the sequence header, picture header or slice set, indicating whether a slice start code is present in slices other than the first slice in the optical grating scanning sequence in the slice set. For example, the flag may be set to 1, indicating that all slices in the slice set carry a slice start code, and to 0, indicating that the first slice in the optical grating scanning sequence in the slice set carries a slice start code but other slices do not carry the slice start code.

If the above start code flag indicates that no slice start code is present in slices other than the first slice in the optical grating scanning sequence in the slice set, the start position of slices other than the first slice in the optical grating scanning sequence in the slice set may be determined according to the position of the upper left corner of the slice set, the length and width of the slice set and the height of the slice (may be the height of one or more macroblocks) in the sequence header, picture header or slice set. For example, when it is determined that the currently coded macroblock is the last macroblock in the slice in the optical grating scanning sequence, the macroblock to be coded next to the current macroblock (in the optical grating scanning sequence) is the first macroblock to be coded in the next slice in the slice set according to the optical grating scanning sequence.

Corresponding to the coding method, the decoding of the slice set is performed by determining the start or end of slices other than the first slice in the optical grating scanning sequence according to the position of the upper left corner of the slice set, the length and width of the slice set and the height of the slice in the sequence header, picture header or slice set.

If no slice start code is present in a slice in the slice set, the slice will not carry such syntax elements as slice_horizontal_position, slice_vertical_position, slice_horizontal_position_extension, and slice_vertical_position_extension. However, such syntax elements as slice_connect, slice_set_syntax, slice_set_reference, and slice_independency may be present. The use of the syntax elements is the same as that described in the first embodiment.

Embodiment 5

In the fifth embodiment of the invention, the slice set technique is applied to resolution based coding. Specifically, a new syntax element slice_resolution_ratio is added on the basis of the first embodiment of the invention, indicating the ratio of the resolution used for the coding and decoding of intra-slice data in a slice set to the original resolution of the picture where the slice set belongs. Accordingly, the decoder may obtain from the bit stream the ratio of the resolution used for the coding of the intra-slice data in the slice set to the original resolution of the slice and perform decoding according to the ratio.

For example, the resolution of the picture represented by FIG. 1 is 128×128, which means there are 128 pixels each in the horizontal direction and the vertical direction of the picture. If the slice_resolution_ratio of the slice set where B0, B1 and B2 belong is 0.5, it indicates that slice data in the slice set is encoded at the resolution of (128×0.5)×(128×0.5). Before data in B0, B1 and B2 is encoded, the resolution of the data is first reduced to half of the original resolution via downsampling before the method in the first embodiment of the invention is used to perform the coding. Accordingly, the decoder decodes the data of B0, B1 and B2 in the method described in the first embodiment of the invention and then increases the resolution of the obtained data to double via upsampling.

Embodiment 6

In the sixth embodiment of the invention, the slice set technique is applied to quality based coding. Specifically, a new syntax element slice bit depth is added on the basis of the first embodiment of the invention, indicating the number of bits used for each pixel when intra-slice data in a slice set is coded or decoded. This means the number of bits required for the coding of each piece of slice data in the coded slice set is also coded in the coding process. For example, if the slice bit depth of the slice set where B0, B1 and B2 belong in the first embodiment of the invention is 10, it indicates 10 bits are used to store a pixel value when B0, B1 and B2 are coded or decoded.

Accordingly, the decoder may obtain the number of storage bits required for each piece of decoded data when slice data in the slice set is decoded and perform decoding according to the number of bits.

Those skilled in the art may understand that all or part of the steps in the foregoing embodiments may be performed by hardware by following instructions of a program. The program may be stored in a computer readable storage medium such as a read-only memory/random access memory (ROM/RAM), a magnetic disk or a compact disk.

Embodiment 7

In the seventh embodiment of the invention, in addition to the information described in the first embodiment, a slice set may also include quantization parameters related to a designated quantization method. The specific process includes: the encoder decides whether slices in the slice set are encoded with a designated quantization method and writes in the slice one or more of the following quantization parameters: a parameter indicating that a designated quantization matrix is used for slices in the current slice set, an index of the designated quantization matrix used for slices in the current slice set, an enable flag indicating adaptive weighted quantization of macroblocks is used for slices in the slice set, a weighted quantization parameter used for the slice set, and the quantization matrix used for slices in the current slice set. The decoder obtains quantization parameter information used for slices in the current slice set and gets one or more of the following parameters according to the quantization parameter information and performs decoding accordingly. The obtaining of quantization parameter information includes one or more of the following: obtaining the parameter indicating the use of a designated quantization matrix for slices in the current slice set; or obtaining the index indicating use of the quantization matrix for slices in the current slice set; or obtaining the enable flag indicating the use of adaptive weighted quantization of macroblocks for slices in the current slice set; or obtaining the weighted quantization parameter used for slices in the current slice set; or obtaining the quantization matrix used for slices in the current slice set.

For example, a weighted quantization matrix is used for coding and a 1-bit weighted matrix enable flag is written in a slice, indicating whether a weighted quantization matrix is used for coding. If the value of the enable flag is 1, 2-bit information is written in the slice, indicating the weighted matrix index used for coding of the slice in the current slice set. If the index value is 0, it indicates that the slice in the slice set uses the same weighted quantization matrix as the picture header or a weighted matrix is preset at the encoder; the value 1, 2, or 3 indicates the use of the weighted quantization matrix or weighted quantization matrix model whose index is 1, 2 or 3. Optionally, a weighted quantization parameter or weighted quantization matrix may be written in the slice.

Accordingly, the decoder resolves slice parameters in the slice set to obtain the weighted matrix enable flag which indicates whether a weighted matrix is used for coding of the slice in the slice set. If the value of the enable flag is 1, the decoder reads 2-bit more information from the slice to get the index of the weighted matrix used for coding of the slice in the current slice set. If the index value is 0, it indicates that the slice in the slice set uses the same weighted quantization matrix as the picture header or a weighted matrix is preset at the decoder; the value 1, 2, or 3 indicates the use of the weighted quantization matrix or weighted quantization matrix model whose index is 1, 2 or 3. Optionally, the decoder may read the weighted quantization parameter or weighted quantization matrix from the slice.

The method in the embodiment of the invention guarantees the use of a designated quantization matrix for a specified region in a picture to adjust the subjective quality of the region and guarantees the coding efficiency of the entire picture as well.

The embodiment of the invention also provides a video encoder and video decoder. The structures of the encoder and decoders will be described in detail.

In addition to the optical grating scanning sequence, the scanning sequence used for sorting the macroblocks or slices in the embodiments of the invention may also be any other scanning sequence determined according a certain rule.

Figure 2:
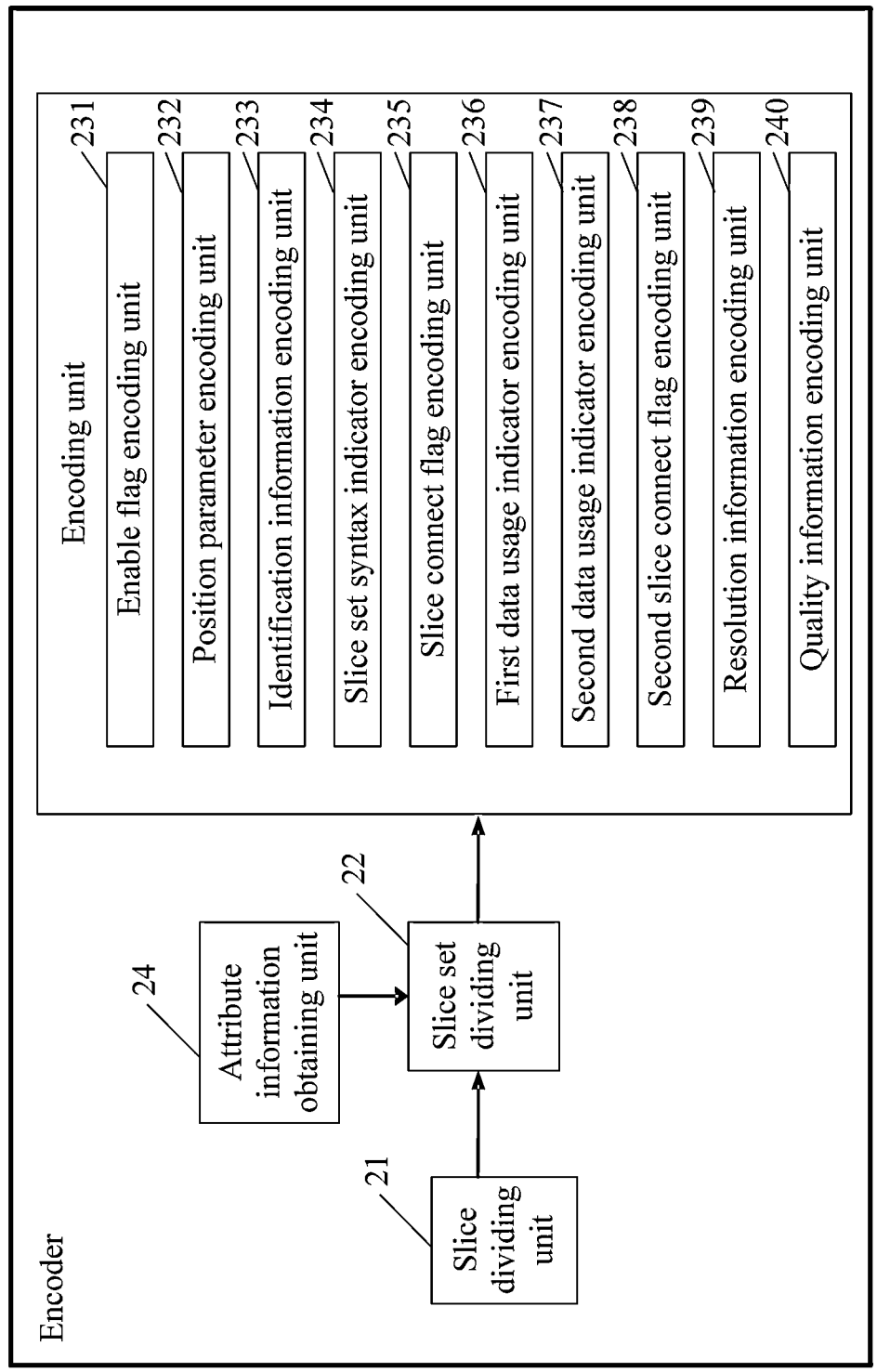
FIG. 2 shows a structure of an encoder according to an embodiment of the invention.

A structure of the encoder provided in the embodiment of the invention is shown in FIG. 2, including the following units:

(1) a slice dividing unit 21, configured to divide a picture to be encoded into several slices, each containing macroblocks continuous in the optical grating scanning sequence in the picture;

(2) a slice set dividing unit 22, configured to divide slices in the picture into one or more slice sets according to attribute information of the slices divided by the slice dividing unit 21, each containing one or more slices; and (3) an encoding unit 23, configured to encode slices in the slice sets divided by the slice set dividing unit 22 to get a coded bit stream of the picture.

Optionally, the encoder may further include an attribute information obtaining unit 24, configured to: obtain one or more of the items, spatial continuity of slices, picture feature, spatial resolution, content of the picture or region, and picture coding quality, as the attribute information and send the information to the slice set dividing unit 22.

Optionally, in the encoder, the encoding unit 23 may include, without limitation, one or more of the following units: (1) an enable flag encoding unit 231, configured to write a slice set enable flag in the coded bit stream obtained by the encoding unit 23, where the flag indicates whether slice sets are divided in the coding process of the current picture so that the decoder knows whether the division of slice sets is performed; (2) a position parameter encoding unit 232, configured to encode at least one of the horizontal position parameter and vertical position parameter of slices in the slice set so that the position information of the slices in the picture is sent to the decoder; (3) an identification information encoding unit 233, configured to encode slice set identification information of the slice set so that the slice set division information of the encoder is sent to the decoder and that the decoder knows the mappings of slice sets and slices, for example, which slice set the current slice belongs to or which slices a slice set includes; (4) a slice set syntax indicator encoding unit 234, configured to encode the information whether slice set syntax elements are present in the current slice so that the decoder determines the slice set syntax elements used by the current slice according to the information; (5) a slice connect flag encoding unit 235, configured to encode the information whether the current slice is the last slice in the current slice set; (6) a first data usage indicator encoding unit 236, configured to encode the information that the reference data used in the coding of the slice is the data in the current slice set or all data in the picture; (7) a second data usage indicator encoding unit 237, configured to encode the information that the data used in the coding of macroblocks in the current slice is the data in the current slice set or all data in the picture; and (8) a second slice connect flag encoding unit 238, configured to encode the information whether the current slice is the first slice in the current slice set.

Optionally, the encoding unit 23 may further include at least one of the following processing units: (1) a resolution information encoding unit 239, configured to encode the ratio of the resolution used for coding of intra-slice data in the slice set to the original resolution of the slice; and (2) a quality information encoding unit 240, configured to encode the number of bits used by each piece of encoded data when the slice data in the slice set is encoded.

Figure 3:
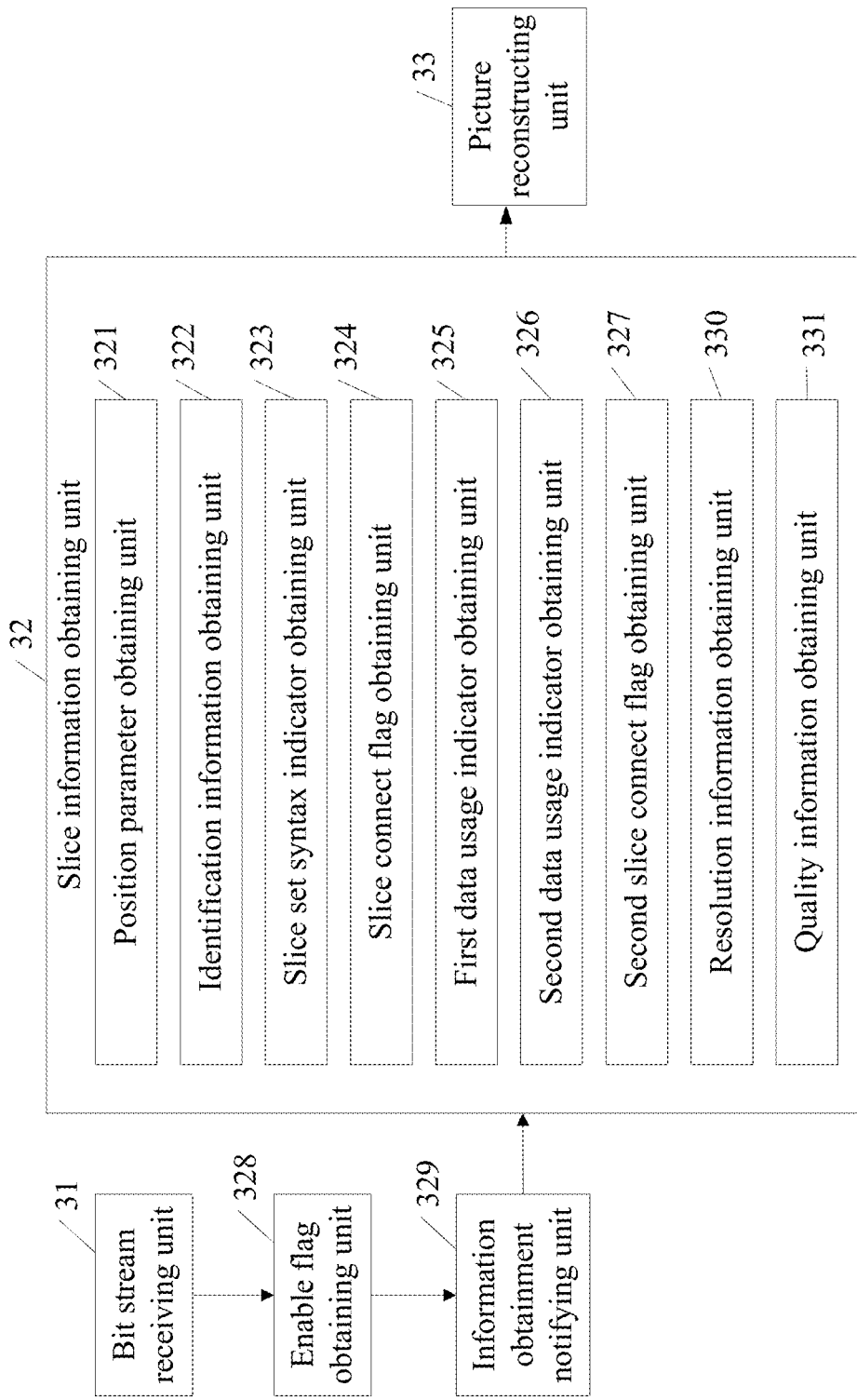
FIG. 3 shows a structure of a decoder according to an embodiment of the invention.

The embodiment of the invention also provides a decoder, of which a specific structure is shown in FIG. 3. As shown in FIG. 3, the decoder includes the following processing units:

(1) a bit stream receiving unit 31, configured to receive a bit stream to be decoded.

(2) a slice information obtaining unit 32, configured to obtain slice and slice set division information from the bit stream to be decoded received by the bit stream receiving unit 31, where a slice includes macroblocks continuous in the optical grating scanning sequence in the picture and a slice set includes one or more slices.

Optionally, in the decoder, the slice information obtaining unit 32 may include, without limitation, one or more of the following units: (1) a position parameter obtaining unit 321, configured to obtain at least one of the horizontal position parameter and vertical position parameter of all slices in the slice sets in the bit stream; (2) an identification information obtaining unit 322, configured to obtain slice set identification information of the slice sets in the bit stream; (3) a slice set syntax indicator obtaining unit 323, configured to obtain the information whether slice set syntax elements are present in the current slice; (4) a slice connect flag obtaining unit 324, configured to obtain the information whether the current slice in the bit stream is the last slice in the current slice set; (5) a first data usage indicator obtaining unit 325, configured to obtain the information that the reference data used in the coding of the slices in the bit stream is the data in the current slice set or all data in the picture; (6) a first data usage indicator obtaining unit 326, configured to obtain the information that the data used in the coding of macroblocks in the bit stream is the data in the current slice set or all data in the picture; and (7) a second slice connect flag obtaining unit 327, configured to obtain the information whether the current slice in the bit stream is the first slice in the current slice set.

(3) a picture reconstructing unit 33, configured to: decode the bit stream according to the slice and slice set division information obtained by the slice information obtaining unit 32 and reconstruct the picture.

Optionally, the decoder may further include the following units: (1) an enable flag obtaining unit 328, configured to obtain the slice set enable flag in the coded bit stream, where the flag indicates whether slice sets are divided in the coding process of the current picture; and (2) an information obtainment notifying unit 329, configured to notify the slice information obtaining unit 32 after determining that the current picture is divided into slice sets.

Optionally, the slice information obtaining unit 32 may further include at least one of the following processing units: (1) a resolution information obtaining unit 330, configured to obtain the ratio of the resolution used for coding of intra-slice data in the slice set to the original resolution of the slice; and (2) a quality information obtaining unit 331, configured to obtain from the bit stream the number of storage units required for each piece of decoded data when the slice data in the slice set is encoded as the quality information.

To sum up, in the embodiments of the invention, through flexible combination of slices and the processing of the coding and decoding of the slice set made up of multiple slices and the syntax elements used in the coding and decoding, region specific, resolution specific and quality specific picture coding and decoding are realized to increase the flexibility of video coding and decoding. Moreover, the video coding and decoding solution provided by the embodiments of the invention is easy to implement. Relative to the conventional art, the solution will effectively reduce the hardware complexity of the coding system and the decoding system. In addition, in the embodiments of the invention, an appropriate slice set enable flag is added so that the solution provided by the embodiments of the invention is well compatible with the existing coding and decoding systems.

Although the invention has been described through some exemplary embodiments, the invention is not limited to such embodiments. It is apparent that those skilled in the art can make various modifications and substitutions to the invention without departing from the spirit and scope of the invention. In view of the foregoing, it is intended that the invention cover modifications and variations of this invention provided they fall within the scope of the following claims and their equivalents.

What is claimed is:

1. A non-transitory computer-readable storage medium which includes a coded bitstream and instructions, the bitstream comprising:
a picture of a video signal or an image signal divided into a plurality of slices, wherein the bitstream identifies a plurality of slice sets, each slice set containing one or more of the plurality of slices; the bitstream further comprises a slice set syntax element for a first slice in a current slice set of the plurality of slice sets, wherein the slice syntax element is quantization parameter information; wherein the slice set syntax element for a second slice is inferred to be equal to the slice set syntax element for the first slice, wherein the second slice is in the current slice set and after the first slice, and wherein the first and second slices are both present in the bitstream as part of the plurality of slices, wherein the instructions, when executed by a processor of a decoding device, cause the decoding device to decode the bitstream into the video signal.

2. The non-transitory storage medium according to claim 1, the bitstream further comprising:
a slice set enable flag indicating that each of the slice sets is divided into at least two slices.

3. The non-transitory storage medium according to claim 1, wherein the bitstream further comprises:
at least one of a horizontal position parameter and a vertical position parameter of each slice in the slice sets.

4. The non-transitory storage medium according to claim 1, wherein the bitstream further comprises encoding information indicating whether a current slice is an initial slice of the current slice set.

5. The non-transitory storage medium according to claim 1, wherein the bitstream further comprises encoding information indicating whether the slice syntax element is present in a current slice.

6. The non-transitory storage medium according to claim 1, wherein the quantization parameter information comprises:
a parameter indicating use of a designated quantization matrix for the first slice.

7. The non-transitory storage medium according to claim 1, wherein the bitstream further comprises:
information indicating that a value for a syntax element of the second slice is inferred to be equal to a value for a corresponding syntax element of the first slice.

8. The non-transitory storage medium according to claim 1, wherein the first slice is an independent slice and the second slice is a dependent slice.

9. The non-transitory storage medium according to claim 1, wherein the bitstream further comprises: information indicating whether a current slice is the last slice in the current slice set.

10. A video coding system, comprising: an encoder and a decoder;
wherein the encoder is configured to:
divide a picture into a plurality of slices, wherein the plurality of slices are grouped into a plurality of slice sets, each slice set containing one or more of the slices, the plurality of slices comprising a first slice and a second slice;
encode the slices into a bitstream;
encode a slice set syntax element for the first slice in a current slice set of the plurality of slice sets into the bitstream, wherein the slice set syntax element is quantization parameter information;
encode information identifying the plurality of slice sets into the bitstream;
send the bitstream to the decoder;
wherein the decoder is configured to:
receive the bitstream;
obtain the slice set syntax element of the first slice in the current slice set from the bitstream;
decode the first slice with the slice set syntax element of the first slice;
decode the second slice with the slice set syntax element of the first slice, wherein the second slice is in the current slice set and after the first slice.

11. The system according to claim 10, wherein the encoder is further configured to encode a slice set enable flag in the bitstream indicating that each of the slice sets is divided into at least two slices.

12. The system according to claim 10, wherein the encoder is further configured to: encode at least one of a horizontal position parameter and a vertical position parameter of each slice in the slice sets.

13. The system according to claim 10, wherein the quantization parameter information comprises: a parameter indicating use of a designated quantization matrix for the first slice.

14. The system according to claim 10, wherein the first slice is an independent slice and the second slice is a dependent slice.

15. The system according to claim 10, wherein the encoder is further configured to: encode information indicating that a value for a syntax element of the second slice is inferred to be equal to a value for a corresponding syntax element of the first slice to the bitstream.

16. The system according to claim 10, wherein the decoder is further configured to: decode the bitstream according to the first slice and the second slice to reconstruct a picture.

* * * * *